United States Patent

[11] 3,614,724

| [72] | Inventors | William L. Brown; John M. Portlock, both of Albuquerque, N. Mex. |
|---|---|---|
| [21] | Appl. No. | 26,570 |
| [22] | Filed | Apr. 8, 1970 |
| [45] | Patented | Oct. 19, 1971 |
| [73] | Assignee | The United States of America as represented by the United States Atomic Energy Commission |

[54] DETECTION SYSTEM
5 Claims, 6 Drawing Figs.

[52] U.S. Cl. .................................................. 340/16 R, 340/258 D, 340/261
[51] Int. Cl. ....................................................... G08b 13/00
[50] Field of Search ........................................... 340/15, 16, 258 B, 258 D, 261

[56] References Cited
UNITED STATES PATENTS

| 3,341,810 | 9/1967 | Wallen, Jr. .................. | 340/15 X |
| 3,525,978 | 8/1970 | Heinecke et al. ............. | 340/16 |

Primary Examiner—Richard A. Farley
Attorney—Roland A. Anderson

ABSTRACT: A detection system which utilizes an automatically varied threshold controlled by noise level in one or more frequency bands while monitoring a plurality of seismic frequency bands where signal and noise do not occur simultaneously. The signal and noise frequency bands may be preselected or they may be automatically determined during operation of the system.

INVENTORS
WILLIAM L. BROWN
JOHN M. PORTLOCK

INVENTORS
WILLIAM L. BROWN
JOHN M. PORTLOCK

DETECTION SYSTEM

BACKGROUND OF INVENTION

Various surveillance systems or devices are commonly used for detecting or monitoring man-associated intrusions (such as personnel or vehicular traffic) within a controlled area, for example in commercial establishments or private residences and security restricted or military areas. One method of providing this surveillance is by monitoring of seismic signals and identifying those which are man-associated. It has been found to be very difficult to identify or distinguish man-associated seismic signals from other extraneous disturbances, such as seismic signals generated by wind, rain, thunder and the like. Another difficulty has been that the optimum alarm threshold may vary with the site of deployment as well as with the seismic signal itself. In the latter case, the frequency generated by a particular man-associated intrusion, such as footsteps, will vary and depend upon the particular site being monitored.

SUMMARY OF INVENTION

In view of the above, it is an object of this invention to provide a novel seismic intrusion detector for monitoring man-associated seismic signals.

It is a further object of this invention to provide a seismic intrusion detection system which is capable of distinguishing man-associated seismic signals from other signals in a wide range of use sites.

Various other objects and advantages will appear from the following description of the invention, and the most novel features will be particularly pointed out hereinafter in connection with the appended claims.

It will be understood that various changes in the details and arrangements of the parts, which are herein described and illustrated in order to explain the nature of the invention, may be made by those skilled in the art.

The invention comprises a seismic detection system including means for generating an electrical signal responsive to seismic movements, variable gain amplifier means coupled to said generating means for amplifying said electrical signal, band-pass filter means coupled to said amplifying means for passing a portion of said amplified electrical signal within a first frequency band, additional band-pass filter means coupled to said amplifying means for passing a different portion of said amplified electrical signal having frequencies outside said first frequency band, means coupled to said amplifying means for varying the gain thereof in response to the amplitude of said frequencies from said additional filter means, and means for sensing the amplitude of signals in said first frequency band and for producing an information signal when said amplitude is above a predetermined amplitude.

DESCRIPTION OF DRAWING

The present invention is described in the accompanying drawing wherein.

DETAILED DESCRIPTION

Seismic disturbances or movements may be measured down to very low frequencies (such as below about 5 Hz.) and amplitudes with variable reluctance detectors known commonly as geophones. Conventional geophones utilize a magnet and coil movable with respect to each other to provide a signal at the same frequency and proportional in amplitude to any seismic movement sensed by the geophone. Output signals from standard geophones may range down to −80 dbv. or less. These geophones are commercially available such as model HS-1 from Hall-Sears, Tulsa, Okla.

Man-associated disturbances may be typified by a seismic "signature" having relatively narrow spectral contents having a frequency dependent upon the terrain, soil, condition of the soil, weather, and time of day, such as predominantly in the 10 to 40 Hz. band for many locations. This may be contrasted with microseisms and other random background noise which exhibit relatively smooth, broad spectral contents ranging from less than about $10^{12}$ Hz. to greater than 100 Hz., again depending upon the location of the geophone. It has been discovered, that for most locations and conditions, that there are frequency bands where man-associated seismic signatures or signals and background noise do not occur simultaneously or are of sufficient amplitude below the man-associated seismic signal to be distinguished therefrom.

The seismic signature of a footstep may be typified by several cycles at the center of the spectral peak. The duration of the resultant envelope may be typically about 0.1 to 0.2 seconds. Since a normal walk is about two steps per second, one person may produce seismic vibrations for about 0.4 of each second. For a given footstep detection range of a geophone, the number of steps a person takes in crossing the range of the instrument may be approximated. These geophones commonly have a capability of detecting a person walking quietly up to about 100 yards or more. It can be seen, that upon proper recognition of the man-associated seismic signal, such as footsteps and counting of the signal pulses or generation of pulses representative thereof, a record of pulse counts and count rate and combinations thereof of the man-associated signals may be accumulated by appropriate counting circuitry and the pulse count readout on a real time or command mode basis, depending upon the use being made of this information. Vehicular activity may produce seismic signatures having strong components in the same pass band as man-generated footsteps and may be detected by the system of this invention.

Figure 1:
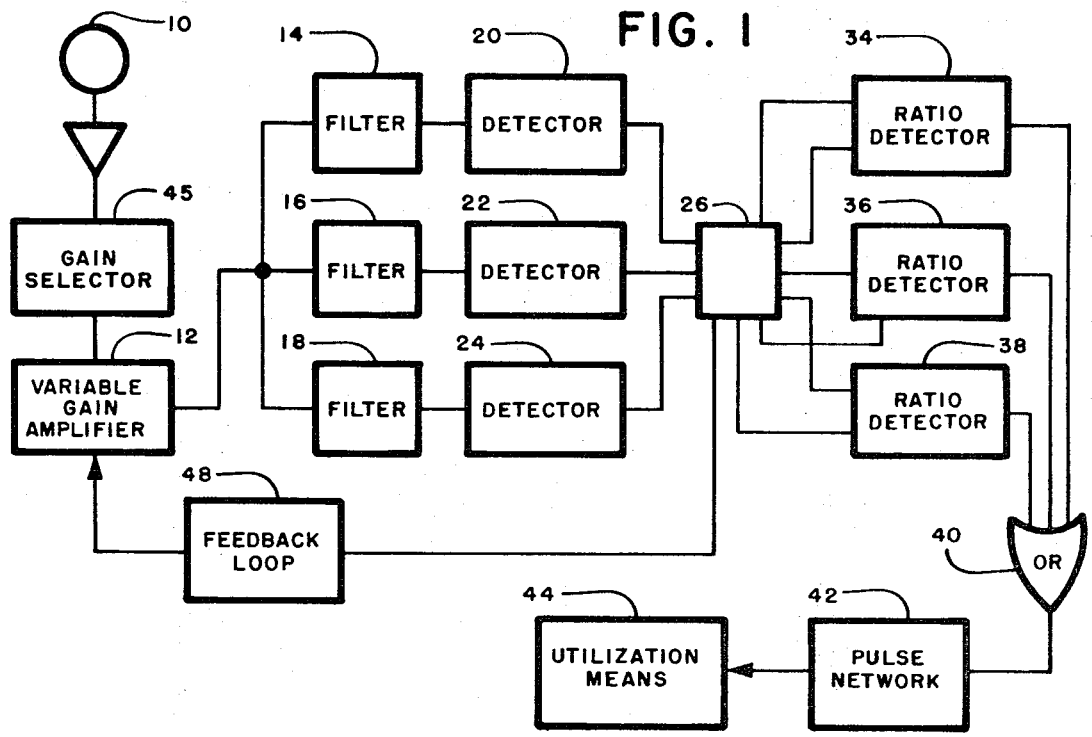
FIG. 1 is a block circuit diagram of a seismic detection system incorporating features of this invention.

The frequency band where signal and noise do not occur simultaneously may be determined empirically. However, it is desirable that a seismic intrusion detection system be useable in a wide range of locations under varying conditions in order to permit mass production of a system and provide for its use or reuse in different situations without modifications or adjustment. A system having this capability is illustrated in FIG. 1.

Figure 2:
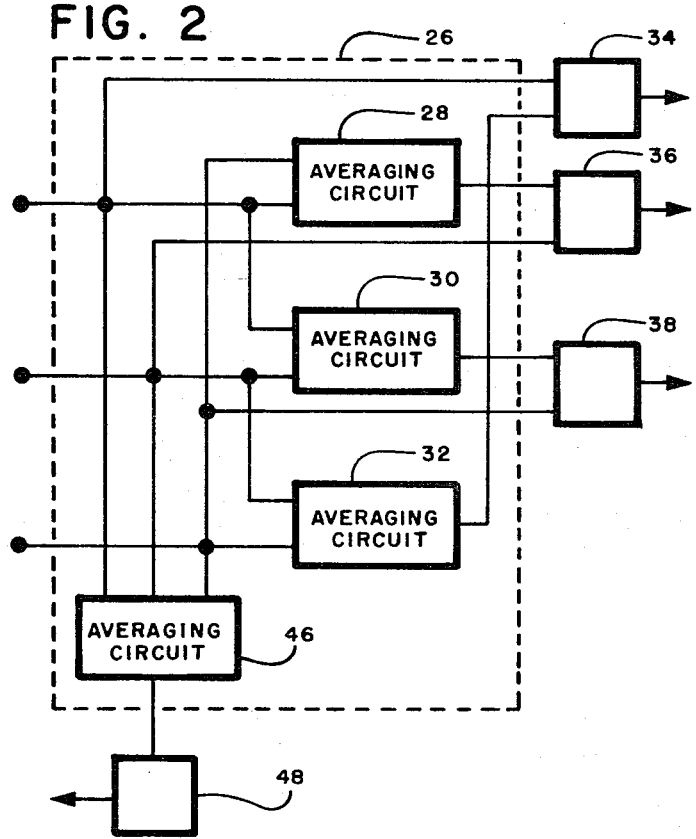
FIG. 2 is a block diagram of an averaging circuit arrangement for the system of FIG. 1.

In this system, a conventional geophone seismic detector 10, as described above, may be coupled through suitable amplifiers, as needed, and a variable gain amplifier 12 to a series of band pass filters 14, 16 and 18, connected generally in parallel. Each of the band-pass filters is selected to pass a particular band of frequencies generally adjacent to each other over a range of frequencies of interest. In a typical application which will provide man-associated signal identification in a wide range of locations and conditions, filter 14 may pass frequencies of from about 6 to 30 Hz., filter 16 may pass frequencies of about 30 to 70 Hz., and filter 18 may pass frequencies of about 70 to 140 Hz. Other pass bands may be used having adjoining or separated frequencies with various band-pass filter characteristic curves, depending on the particular application and needs. Any seismic signals in these pass bands may be detected by detectors 20, 22, and 24, respectively, and a voltage or current produced thereby that varies in accordance with amplitude of the original signal. The detector outputs may then be coupled to an appropriate logic and averaging circuit 26, as shown by way of example in FIG. 2. Each of the detector outputs may be combined with the other detector outputs to provide a signal representing the average of each combination of two detector outputs, such as with averaging circuits 28, 30, and 32 and the interconnections shown in FIG. 2. The average signals so produced may then be coupled to one input of each of the ratio detectors 34, 36, and 38 and the amplitude of these average signals compared to the amplitude of the original signal output from detectors 20, 22, and 24. Ratio detectors 34, 36, and 38 may be adjusted to produce an output signal, or to pass the output of detectors 20, 22, and 24, should a detector output exceed the average output signal of the other two detectors by some predetermined amount, such as by about 12 db. The outputs of ratio detectors 34, 36, and 38 may be appropriately connected to a logic OR-circuit 40 so that any detector output signal having the desired amplitude above the average output signal of the other two detector outputs will pass OR-circuit 40 or generate a pulse therein representative of that signal. The pulse so generated or other signal output may be processed by an appropriate pulse network and counting circuit 42, and the accumulation of pulse information therein acted upon or otherwise utilized by utilization circuit 44.

Figure 3:
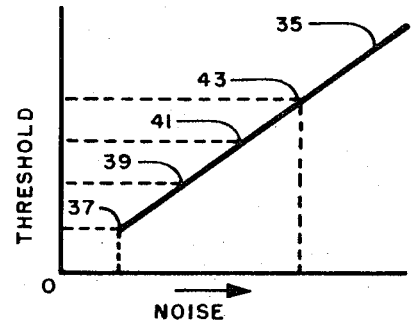
FIG. 3 is a diagram of threshold versus noise illustrating the operation of the feedback circuit of the system shown in FIG. 1.

The outputs from detectors 20, 22, and 24 may be averaged, such as by the averaging circuits described above, in additional averaging circuit 46 or one of the outputs may be used to provide a feedback signal through feedback network 48 to variable gain amplifier 12. Thus, as the noise amplitude increases, the gain of the system may be varied in some appropriate manner, such as shown by line 35 in FIG. 3, to maintain the output signals from detectors 20, 22, and 24 and circuit 26 in the dynamic range (linear-operating range) of ratio detectors 34, 36, and 38. If desired, provision may be made to increase or decrease system sensitivity by an adjustment of the lowest threshold level at which a seismic signal may produce an output pulse. These adjustments may be at levels 37, 39, 41, and 43. The ratio detector dynamic range may follow line 35 from the desired threshold level adjustment. These threshold level adjustments may be provided by variable attenuators in the feedback loop or in the variable gain amplifier 12, as shown by control 45.

Figure 4:
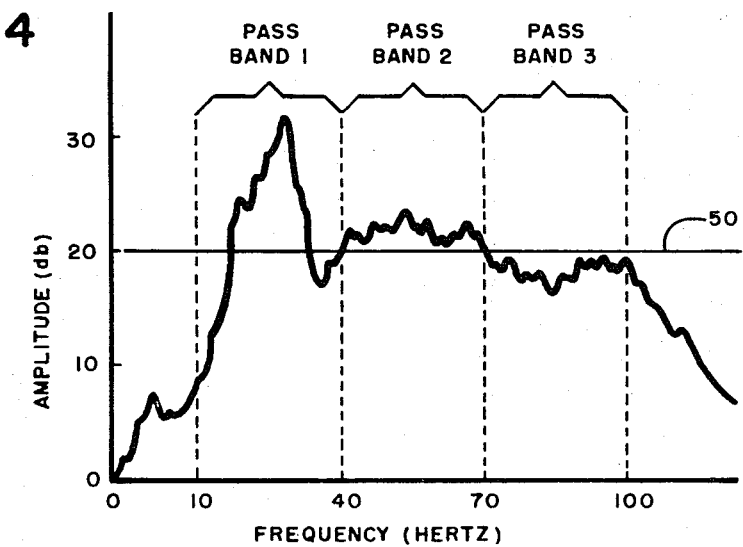
FIG. 4 is a diagram of seismic signal amplitudes versus frequency illustrating the operation of the seismic detection system shown in FIG. 1.

FIG. 4 illustrates a typical seismic signal envelope which might occur in some particular location and under some types of conditions. It can be seen, that the only pass band which may generate an output signal in the ratio detectors is the signal in pass band 1. If this signal amplitude is greater than the average amplitude of the other pass bands, as represented by line 50, to a sufficient degree, such as the 12 db. mentioned above, a pulse may be recorded in pulse circuit 42. Neither of the other two ratio detectors will produce an output. If the signal in pass band 1 is less than 12 db. above average line 50 there would not be any output signal from OR-circuit 40.

Utilization means 44 and pulse circuit 42 may be any combination of scaler and counting circuits, storage devices, alarm systems or the like together with radio transmitting and receiving systems if so desired.

Figure 5:
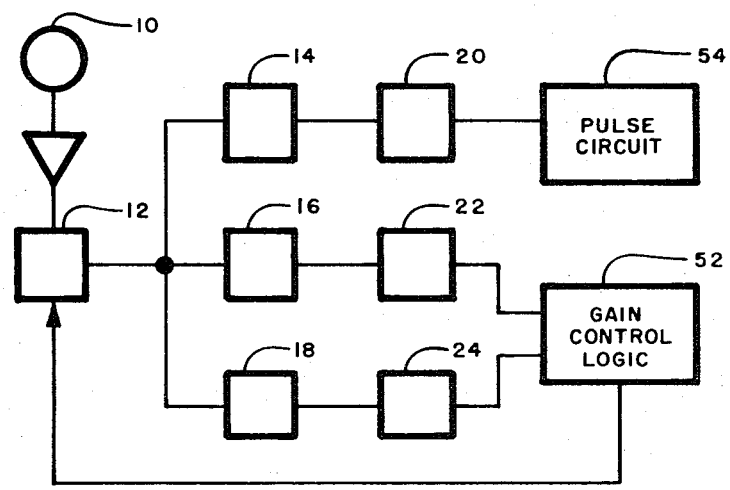
FIG. 5 is a block circuit diagram of a modified seismic detection system.
Figure 6:
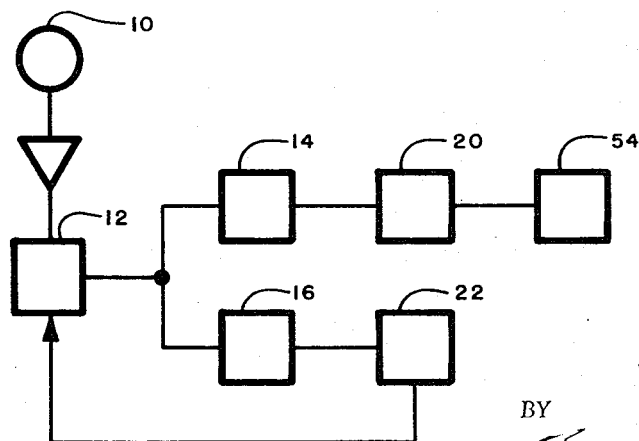
FIG. 6 is a block circuit diagram of still another embodiment of a seismic detection system.

If the location or site which is to be monitored by the seismic intrusion detection system is known so that the man-associated seismic signals can be predicted, a seismic intrusion detection system may be used having a preselected pass band identified as the signal channel. Such systems are illustrated in FIGS. 5 and 6. In these systems, the pass band of filters 14 is used as the signal channel with the other pass bands designated as background noise. In the embodiment of FIG. 5, the other pass bands, namely the outputs of detectors 22 and 24 are utilized by a gain control logic circuit 52 to provide the desired amount of feedback and gain control of variable gain amplifier 12. Either the average of the two detector outputs or the lowest amplitude detector output may be used to produce a proportional control signal. The signal detector 20 output may be fed to a suitable pulse circuit or network and utilization circuit 54 and operated upon in the same manner as circuits 42 and 44 in FIG. 1.

In the embodiment of FIG. 6, the output of detector 22 may be used directly or through some intermediate circuit (not shown) to control the gain of variable gain amplifier 12. The output of the signal detector 20 may be utilized in the same manner as described with respect to FIG. 5.

The pass bands for the respective filters of the embodiments shown in FIGS. 5 and 6 may be similar with or the same as those utilized in the system described with respect to FIG. 1, namely pass bands of about 6 to 30, 30 to 70 and 70 to 140 Hz. If desired, the system, such as shown in FIG. 6 may be utilized with a pass band of about 10 to 40 Hz. in signal filter 14 with a 10 to 40 Hz. band reject filter as filter 16. The system shown in FIG. 5 will generally permit more consistent detection of a wider variety of targets or man-associated signals with better noise immunity than the system shown in FIG. 6.

What is claimed is:

1. A detection system comprising means for generating an electrical signal responsive to seismic disturbances, variable gain amplifier means coupled to said generating means for amplifying said electrical signal, band-pass filter means coupled to said amplifying means for passing a portion of said amplified electrical signal within a first frequency band, additional filter means coupled to said amplifying means for passing a different portion of said amplified electrical signal having frequencies outside said first frequency band, means coupled to said amplifying means for varying the gain thereof in response to the amplitude of said frequencies from said additional filter means, and means for sensing the amplitude of signals in said first frequency band and for producing an information signal when said amplitude is above a predetermined amplitude relative to the amplitude of the frequencies from said additional filter means.

2. The system of claim 1 wherein said additional filter means includes a plurality of band-pass filter means coupled to said amplifying means for passing different frequency portions of said amplified electrical signal.

3. The system of claim 2 including separate ratio detector means each having a first input coupled to the output of one of said band-pass filter means, and means for averaging the outputs of each combination of two band-pass filter means and for coupling each average thereof to a second input of one of said ratio detectors, said ratio detector means providing said information signal when the amplitude at said first input exceeds the amplitude at said second input by a predetermined amount.

4. The system of claim 3 including means for producing a pulse for each of said information signals and for processing said pulses.

5. The system of claim 3 including means for adjusting the threshold limit of said ratio detector means.